United States Patent Office 2,851,178
Patented Sept. 9, 1958

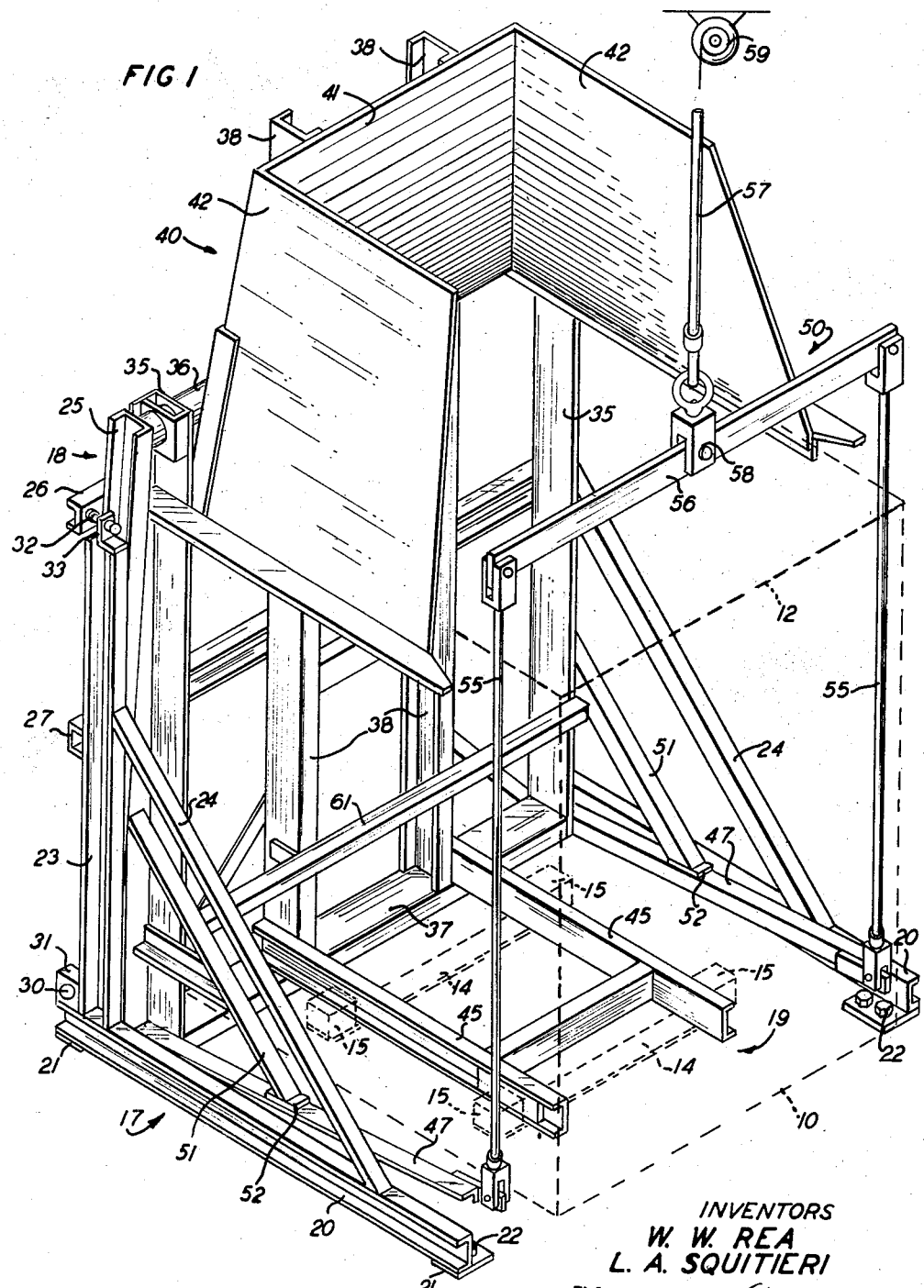

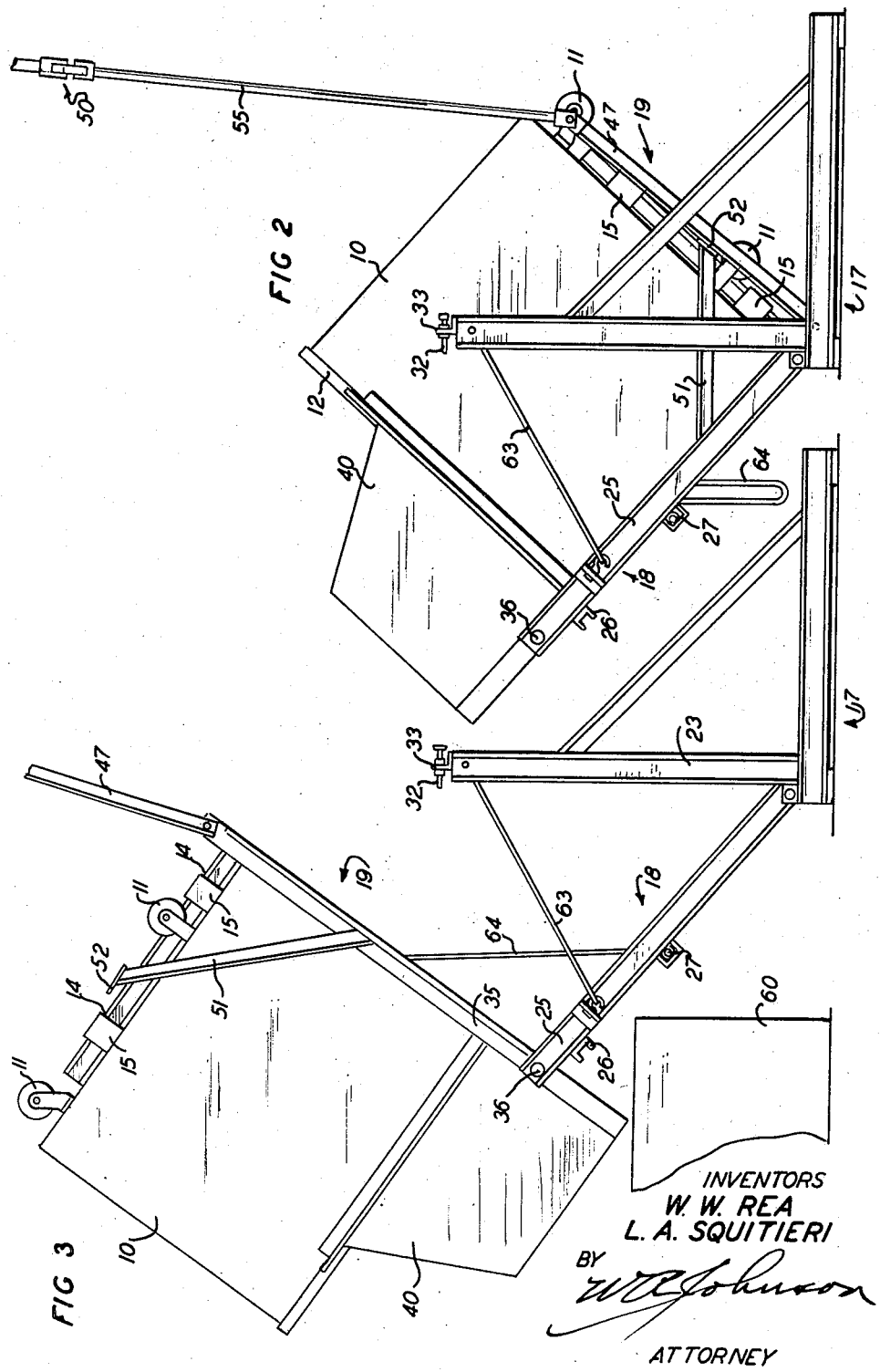

2,851,178

APPARATUS FOR UNLOADING CONTAINERS

Wilson W. Rea, Summit, N. J., and Lawrence A. Squitieri, Brooklyn, N. Y., assignors to Western Electric Company, Incorporated, New York, N. Y., a corporation of New York Application December 12, 1955, Serial No. 552,458

5 Claims. (Cl. 214—313)

This invention relates to apparatus for unloading containers particularly roller supported containers which are too large and too heavy to be upended manually.

In most manufacturing plants and numerous other places, large roller supported containers are used for receiving numerous types of articles and materials. One common use for containers of this type is for the collection of trash, scrap paper or the like to be transported therein to a receptacle such as a feeding unit for an incinerator. These containers, being large and heavy, cannot be unloaded rapidly by manual methods.

The object of the present invention is an apparatus for readily receiving roller supported containers and upending them to unload the contents thereof.

In the present embodiment of the invention, according to the object, a cradle adapted to receive and support the containers singly is disposed in a stationary frame and movable therein between a receiving position and an unloading position to receive and hold the container during this movement to effectively unload the contents of the containers.

More specifically, the apparatus includes an open L-shaped frame pivotally supporting a carriage for movement from its vertical loading position to a predetermined angle therefrom to start the tilting motion of the cradle which is pivotally connected to the carriage. A moving means, including levers pivotally connected to the cradle, engage legs of the cradle to cause tilting of the carriage with the cradle, during the first action of the moving means, followed by pivotal movement of the cradle relative to the carriage a limit distance to upend the container.

Other objects and advantages will be apparent from the following detailed description when considered in conjunction with the accompanying drawings, wherein:

Fig. 1 is an isometric view of the apparatus shown in its receiving position;

Fig. 2 is a side elevational view of the apparatus shown in the intermediate position where the carriage has been rocked into its unloading position with the cradle and container, and Fig. 3 is a side elevational view of the apparatus with the cradle in its unloading position.

Before considering the structure of the apparatus, attention is directed to the general structure of a container 10 which is of the well-known type supported by rollers 11 mounted on the bottom thereof and having an open top 12. Each container 10 has stirrups 14 added thereto, which may be metal strips secured to spaced blocks 15, the blocks being fixed to the bottom of the container predetermined distances apart to position the intermediate portions of the stirrups given distances from the bottom of the container.

The apparatus includes three main parts which are a stationary L-shaped frame 17, a carriage or pivotal frame 18 and a cradle 19. The frame 17 includes horizontal channel members 20 with metallic feet 21 welded or otherwise secured thereto for mounting on the floor by suitable means 22. Vertical channel members 23 of the frame are fixedly mounted, by suitable means such as welding, to the horizontal members 20 and are provided with angular braces 24. The cradle 18 is constructed largely of parallel channel members 25 reinforced by laterally extending channel members 26 and 27. The lower ends of the channel members 25 are provided with suitable bearings (not shown) for mounting on a shaft 30. The shaft 30 has its ends supported in bearings 31 which are mounted in the angular pocket adjacent the juncture of channel members 20 and 23 of the frame at each side thereof. The channel members 26 and 27 extend beyond the channel members 25 of the cradle upon each side of the apparatus. An adjustable screw 32 disposed above the top of each vertical channel member 23 of the frame and supported in brackets 33 may be adjusted to control the receiving position of the carriage and cradle through engagement of the ends of the channel member 26 with the adjustable screws.

The cradle 19 has a vertical structure composed first of side angles 35 pivotally supported adjacent their upper ends upon a shaft 36 mounted in the upper ends of the channel members 25 of the carriage 18. Suitable bearings may be provided for the parts movable on the shaft 36. A lateral channel member 37 is fixed to the lower ends of the angle member 35 and intermediate channels 38. The channel members 38 are supported by the shaft 36 and extend above the angle members 35 (as shown in Fig. 1) to support a chute 40. The chute 40 is U-shaped in cross-section, having its central portion 41 fixed to the channel members 38 in a plane parallel therewith and side portions 42 tapering inwardly to the exit end of the chute. The vertical structure of the cradle 19 has a foot composed mainly of parallel channel members 45 fixed to the vertical channel members 38 and the lateral channel member 37 adjacent the junctures thereof to enter the stirrups 14 of the successive containers as they are rolled into the receiving position. The cradle 19 also has levers 47 pivotally connected at their rearward or inner ends to the vertical angles 35 and connected at their forward or outer ends to the lifting means indicated generally at 50, to assist in the efficient operation of the apparatus and the successive movement of the carriage and the cradle. Legs 51 fixed to the vertical angle members 35 of the cradle 19 are provided with feet 52 to engage their respective levers 47 during the initial movement of the apparatus to the position shown in Fig. 2.

The lifting or operating means 50 begins with rods 55 disposed upon each side of the open front of the frame with their lower ends connected to the levers 47 and their upper ends connected to a horizontal bar 56. A cable 57, provided with a pivotal or swivel connection 58 with the bar 56, extends over a pulley 59 to any desired drive means (not shown).

Before considering the operation of the apparatus, it may be well to consider it fixedly mounted adjacent a receptacle 60 which is to receive the contents of successive containers 10. The containers may be rolled singly into the apparatus through the open front of the frame where the stirrups 14 of each container will extend beneath the foot or channel members 45 and in this manner form a temporary positive connection with the cradle 19. As soon as the container is in position engaging any suitable bumper such as 61 formed, if desired, of resilient material, the lifting means 50 may be operated to move the apparatus into its first position (shown in Fig. 2) where the carriage 18 moves simultaneously with the cradle 19 a distance limited by two cables or chains 63 connecting each side of the carriage with the adjacent sides of the frame. Continued movement of the operating or lifting means 50 will cause the cradle 19 to pivot about the shaft 36 from the position shown in Fig. 2 to that shown in Fig. 3. While the cradle is being moved into this position with the container, the contents of the container will move out of the container and into the receptacle, guided during this unloading operation by the chute 40. A cable or chain 64 connecting the channel member 27 of the carriage 18 and a desired portion of the cradle 19 serves to limit the tilting motion of the actuating means 50 to stop the cradle in its unloading position shown in Fig. 3.

Returning again to Fig. 2 while considering the movement of the apparatus into the loading position and comparing it with the position shown in Fig. 1, it will be noted that the feet 52 of the legs 51 of the cradle 19 rest upon the levers 47 to provide a rigid structure in holding the levers against pivoting during the initial movement of the apparatus from the receiving position (shown in Fig. 1) to the intermediate position (shown in Fig. 2). This assures tilting of the apparatus with the filled container into the intermediate position which is the final or unloading position of the carriage 18. At this point, the carriage 18 is held against further movement by the cables 63 while continued upward movement of the power means 50 will continue rocking movement of the cradle about its shaft 36 to the position shown in Fig. 3.

The apparatus may be returned to its receiving position by releasing the pulling force on the cable 57. The major portion of the weight of the cradle 19 and the weight of the empty container are at the right (Fig. 3) of the shaft 36 causing their movement clockwise about the shaft 36 until the cradle reaches the position shown in Fig. 2. Further, releasing of the cable 57 will allow the cradle 19 with its container and the carriage to return to the receiving position shown in Fig. 1. At this time, the empty container may be removed from the apparatus and a filled container may be moved into position forming its interlocking connection through the stirrups 14 and the foot 45 and move through its successive stages as illustrated in Figs. 1, 2 and 3 to bring about unloading of the container.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for unloading contents of open top containers supported for movement on a floor by rollers and having stirrups extending downwardly short of the floor and secured to the bottoms of the containers, the apparatus comprising an L-shaped cradle with a normally positioned vertical portion to stop a leading end of each container and a normally horizontal portion positioned above the floor to enter the stirrup of each container and cooperate with the vertical portion to support the container, a frame fixedly mounted on the floor on each side of the cradle, a carriage similar in height to the L-shaped cradle, having a lower portion pivotally connected to the frames and an upper portion pivotally connected to the vertical portion of the cradle to support the cradle above the floor, means connecting the carriage to the frames to limit movement of the carriage about its lower pivot with the cradle to a given angle with respect to the frames, means connecting the carriage and the cradle to limit further movement of the cradle relative to the carriage into an upended position, means actuable to move the cradle successively about the pivots from its normal position to its upended position, and a member carried by the cradle and engaging the moving means to cause movement of the cradle with the carriage to the limit of movement of the carriage.

2. An apparatus for unloading contents of open top containers supported for movement on a floor by rollers and having stirrups extending downwardly short of the floor and secured to the bottoms of the containers, the apparatus comprising an L-shaped cradle with a normally positioned vertical portion to stop a leading end of each container and a normally horizontal portion positioned above the floor to enter the stirrup of each container and cooperate with the vertical portion to support the container, a frame fixedly mounted on the floor on each side of the cradle, a carriage similar in height to the L-shaped cradle, having a lower portion pivotally connected to the frames and an upper portion pivotally connected to the vertical portion of the cradle to support the cradle above the floor, means connecting the carriage to the frames to limit movement of the carriage about its lower pivot with the cradle to a given angle with respect to the frames, means connecting the carriage and the cradle to limit further movement of the cradle relative to the carriage into an upended position, means actuable to move the cradle successively about the pivots from its normal position to its upended position, a member carried by the cradle and engaging the moving means to cause movement of the cradle with the carriage to the limit of movement of the carriage, and a chute mounted on the cradle substantially parallel with the horizontal portion to partially surround the open top of each container to direct the contents from successive containers in a given path.

3. An apparatus for unloading contents of open top containers supported for movement on a floor by rollers and having stirrups extending downwardly short of the floor and secured to the bottoms of the containers, the apparatus comprising an L-shaped cradle with a normally positioned vertical portion to stop a leading end of each container and a normally horizontal portion positioned above the floor to enter the stirrup of each container and cooperate with the vertical portion to support the container, a frame fixedly mounted on the floor on each side of the cradle, a carriage similar in height to the L-shaped cradle, having a lower portion pivotally connected to the frames and an upper portion pivotally connected to the vertical portion of the cradle to support the cradle above the floor, means connecting the carriage to the frames to limit movement of the carriage about its lower pivot with the cradle to a given angle with respect to the frames, means connecting the carriage and the cradle to limit further movement of the cradle relative to the carriage into an upended position, means actuable to vary the normal position of the cradle relative to the frames to vary the position of the horizontal portion of the cradle to enter the stirrups of successive containers, means actuable to move the cradle successively about the pivots from its normal position to its upended position, and a member carried by the cradle and engaging the moving means to cause movement of the cradle with the carriage to the limit of movement of the carriage.

4. An apparatus for unloading contents of open top containers supported for movement on a floor by rollers and having stirrups extending downwardly short of the floor and secured to the bottoms of the containers, the apparatus comprising an L-shaped cradle with a normally positioned vertical portion to stop a leading end of each container and a normally horizontal portion positioned above the floor to enter the stirrup of each container and cooperate with the vertical portion to support the container, a frame fixedly mounted on the floor on each side of the cradle, a carriage similar in height to the L-shaped cradle, having a lower portion pivotally connected to the frames and an upper portion pivotally connected to the vertical portion of the cradle to support the cradle above the floor, means connecting the carriage to the frames to limit movement of the carriage about its lower pivot with the cradle to a given angle with respect to the frames, means connecting the carriage and the cradle to limit further movement of the cradle relative to the carriage into an upended position, a lever having one end pivotally connected to the cradle, means connected to the other end of the lever to move the cradle about its pivots, and a leg carried by the cradle to engage the lever intermediate its ends to cause moving of the cradle with the carriage about the lower pivot to the limit of the movement of the carriage prior to movement of the cradle to its upsetting position.

5. An apparatus for unloading contents of open top containers supported for movement on a floor by rollers and having stirrups extending downwardly short of the floor and secured to the bottoms of the containers, the apparatus comprising an L-shaped cradle with a normally positioned vertical portion to stop a leading end of each container and a normally horizontal portion positioned above the floor to enter the stirrup of each container and cooperate with the vertical portion to support the container, a frame fixedly mounted on the floor on each side of the cradle, a carriage similar in height to the L-shaped cradle, having a lower portion pivotally connected to the frames and an upper portion pivotally connected to the vertical portion of the cradle to support the cradle above the floor, means connecting the carriage to the frames to limit movement of the carriage about its lower pivot with the cradle to a given angle with respect to the frames, means connecting the carriage and the cradle to limit further movement of the cradle relative to the carriage into an upended position, means actuable to move the cradle successively about the pivots from its normal position to its upended position, a member carried by the cradle and engaging the moving means to cause movement of the cradle with the carriage to the limit of movement of the carriage, the connecting means between the carriage and the frames and between the cradle and the carriage maintaining the distribution of the weight of the cradle, with a container thereon, such that releasing of the moving means will result in the cradle and carriage returning to their normal positions.

References Cited in the file of this patent

UNITED STATES PATENTS

| | | |
|---|---|---|
| 1,261,511 | Goeringer | Apr. 2, 1918 |
| 1,430,655 | Irrgang | Oct. 3, 1922 |
| 2,388,987 | Morrison | Nov. 13, 1945 |
| 2,420,848 | Trinaistich | May 20, 1947 |
| 2,734,647 | Cunningham | Feb. 14, 1956 |